(12) United States Patent
Oohata et al.

(10) Patent No.: US 11,143,384 B2
(45) Date of Patent: Oct. 12, 2021

(54) LED LIGHTING DEVICE AND PLANT CULTIVATION SHELF

(71) Applicant: SHIBAKAWA MANUFACTURING CO., LTD., Kanagawa (JP)

(72) Inventors: Yuuji Oohata, Kanagawa (JP); Tadashi Watanobe, Kanagawa (JP); Setsu Sato, Kanagawa (JP)

(73) Assignee: SHIBAKAWA MANUFACTURING CO., LTD., Kanagawa (JP)

( * ) Notice: Subject to any disclaimer, the term of this patent is extended or adjusted under 35 U.S.C. 154(b) by 357 days.

(21) Appl. No.: 16/296,106

(22) Filed: Mar. 7, 2019

(65) Prior Publication Data

US 2019/0293264 A1 Sep. 26, 2019

Related U.S. Application Data

(63) Continuation-in-part of application No. PCT/JP2018/011041, filed on Mar. 20, 2018.

(30) Foreign Application Priority Data

Sep. 14, 2018 (JP) .............................. JP2018-172550

(51) Int. Cl.
*F21V 7/00* (2006.01)
*A01G 7/04* (2006.01)
(Continued)

(52) U.S. Cl.
CPC .............. *F21V 7/005* (2013.01); *A01G 7/045* (2013.01); *A01G 9/20* (2013.01); *F21V 7/06* (2013.01);
(Continued)

(58) Field of Classification Search
CPC ... F21V 7/005; F21V 7/06; F21V 7/00; F21V 7/04; F21V 7/05; A01G 7/045;
(Continued)

(56) References Cited

U.S. PATENT DOCUMENTS 9,851,090 B2 * 12/2017 Scribante ............ F21V 23/0442
2005/0225222 A1 * 10/2005 Mazzochette ............. G09F 9/33
313/46

(Continued)

FOREIGN PATENT DOCUMENTS

JP 2008-098088 A 4/2008
JP 201 1-501362 A 1/2011
(Continued)

OTHER PUBLICATIONS

Extended European Search Report issued in European Patent Application No. EP19160220.0, dated Jun. 27, 2019 (7 pages).

*Primary Examiner* — Tsion Tumebo
(74) *Attorney, Agent, or Firm* — Nakanishi IP Associates, LLC

(57) ABSTRACT

An LED lighting device 10 includes: a substrate 15 formed in an elongated shape; a first reflector 11 formed in a single rail shape on the surface of the substrate 15; plural LED elements 16 (16a and 16b) arranged in rows at positions on both sides of the first reflector 11 on the surface of the substrate 15; and a pair of rail-shaped second reflectors 12 (12a and 12b) formed on the surface of the substrate 15 in such a manner that the LED elements 16 (16a and 16b) and the first reflector 11 are interposed between the pair of second reflectors 12a and 12b.

6 Claims, 13 Drawing Sheets

(51) Int. Cl.
  *A01G 9/20* (2006.01)
  *F21V 7/06* (2006.01)
  *F21Y 103/10* (2016.01)
  *F21Y 115/10* (2016.01)
  *F21Y 105/10* (2016.01)
(52) U.S. Cl.
  CPC ....... *F21Y 2103/10* (2016.08); *F21Y 2105/10* (2016.08); *F21Y 2115/10* (2016.08)
(58) Field of Classification Search
  CPC ....... A01G 9/20; A01G 9/249; F21Y 2105/10; F21Y 2103/10; F21Y 2115/10; F21S 8/00
  See application file for complete search history.

(56) References Cited

U.S. PATENT DOCUMENTS

| | | | |
|---|---|---|---|
| 2008/0089069 A1* | 4/2008 | Medendorp | F21V 29/763 362/294 |
| 2012/0026737 A1 | 2/2012 | Dine et al. | |
| 2013/0235553 A1 | 9/2013 | Lin | |
| 2014/0168955 A1* | 6/2014 | Gershaw | F21S 8/026 362/147 |
| 2016/0252218 A1* | 9/2016 | Fujikawa | G02F 1/1336 362/241 |
| 2016/0360712 A1* | 12/2016 | Yorio | A01G 9/249 |
| 2017/0027110 A1* | 2/2017 | Ito | G06K 9/00657 |
| 2018/0317411 A1* | 11/2018 | Spiro | A01G 31/06 |
| 2019/0086058 A1* | 3/2019 | Lim | F21V 13/04 |

FOREIGN PATENT DOCUMENTS

| | | |
|---|---|---|
| JP | 2012-055200 A | 3/2012 |
| JP | 2012-143175 A | 8/2012 |
| JP | 2013-143961 A | 7/2013 |
| JP | 2015-018928 A | 1/2015 |
| JP | 2015-032581 A | 2/2015 |
| JP | 2015-207345 A | 11/2015 |
| WO | 2009/052093 A1 | 4/2009 |
| WO | 2010/112205 A1 | 10/2010 |

* cited by examiner

<FIRST EXAMPLE>

<SECOND EXAMPLE>

<THIRD EXAMPLE>

<FOURTH EXAMPLE>

<FOURTH EXAMPLE>

<FIRST COMPARATIVE EXAMPLE>

<FIFTH EXAMPLE>

LED LIGHTING DEVICE AND PLANT CULTIVATION SHELF

CROSS-REFERENCE TO RELATED APPLICATIONS

This application is a continuation-in-part application of PCT application No. PCT/JP2018/011041 filed on Mar. 20, 2018, and is based upon and claims the benefit of priority from Japanese Patent Application No. 2018-172550 filed on Sep. 14, 2018, the entire contents of each of which are incorporated herein by reference.

FIELD

The present invention relates to a lighting device equipped with an LED (light emitting diode) as a light source and a plant cultivation shelf.

BACKGROUND

As a method of cultivating agricultural products, attention has been focused on a plant factory for cultivating plants in a closed space in which internal environments such as light, temperature, and carbon dioxide concentration are controlled.

According to such a plant factory, there are many advantages as follows: (i) plants can be mass-produced on a narrow land without being influenced by the weather; (ii) it can stably supply high value-added plants in terms of, e.g., pesticide-free, freshness, and cleanliness; and (iii) it is consistent with food safety, security, and health consciousness.

As a lighting device for cultivating plants, there is known a device that uses a high-pressure sodium lamp, a metal halide lamp, or a fluorescent lamp for a light source. In recent years, from the viewpoint of energy saving and environmental measures, LEDs (light emitting diodes) have come to be adopted as light sources instead of these conventional light sources.

Since the power consumption of the LED is about ½ to ¼ of that of the conventional light source, the life span of the LED is much longer than that of the conventional light source, and thus the LED contributes to the cost reduction of plant operations.

Additionally, since the LED emits less heat than the conventional light source, it is possible to avoid leaf scorch (i.e., leaf burn) of plants even when the LED is used for illumination in close proximity. Thus, the LED enables multistage cultivation, which also contributes to improving yield per unit area.

However, LED lighting has strong directivity. In this respect, it is pointed out as a problem that the illuminance at the central portion where the optical axes of the LEDs cross each other in the illumination area is larger than the illuminance on the edge portion and its illuminance distribution becomes non-uniform consequently. When such non-uniformity is present in the illuminance distribution, non-uniformity in growth of plants becomes larger. In order to make the illuminance distribution uniform, there is a known technique of performing LED illumination through, e.g., a diffusion plate that is turbid in milky white or subjected to surface processing by using a fine lens (e.g., Japanese Unexamined Patent Application Publication No. 2017-131189).

However, in the above-described known technique, there is a problem that the power efficiency is lowered due to the illuminance loss caused by the attenuation of the LED light when the LED light passes through the diffusion plate. Additionally, it is necessary to prepare a diffusion plate that has an area corresponding to the illumination area of the LED light, which raises the operational cost as a further problem.

SUMMARY OF THE INVENTION

In view of the above-described problems, an object of the present invention to provide an LED lighting device and a plant cultivation shelf, each of which can suppress the operational cost by avoiding illuminance loss of LED light and can equalize the illuminance distribution in the illumination area.

An LED lighting device according to the present invention includes: a substrate formed in an elongated shape; a first reflector formed in a single rail shape on the surface of the substrate; plural LED elements arranged in rows at positions on both sides of the first reflector on the surface of the substrate; and a pair of rail-shaped second reflectors formed on the surface of the substrate in such a manner that the plural LED elements and the first reflector are interposed between the pair of second reflectors.

A plant cultivation shelf according to the present invention includes: the above-described LED lighting device according to the present invention; a shelf board on which a plant is placed; and a support member configured to support the LED lighting device and the shelf board at respective positions where the LED lighting device and the shelf board face each other.

According to the present invention, it is possible to provide an LED lighting device and a plant cultivation shelf, each of which can suppress the operational cost by avoiding illuminance loss of LED light and can equalize the illuminance distribution in the illumination area.

BRIEF DESCRIPTION OF THE DRAWINGS

In the accompanying drawings:

FIG. 10 is a cross-sectional view of an LED lighting device according to a modification of the LED lighting device shown in

FIG. 1A;

DETAILED DESCRIPTION

Hereinbelow, embodiments of the present invention will be described by referring to the accompanying drawings.

Figure 1A:
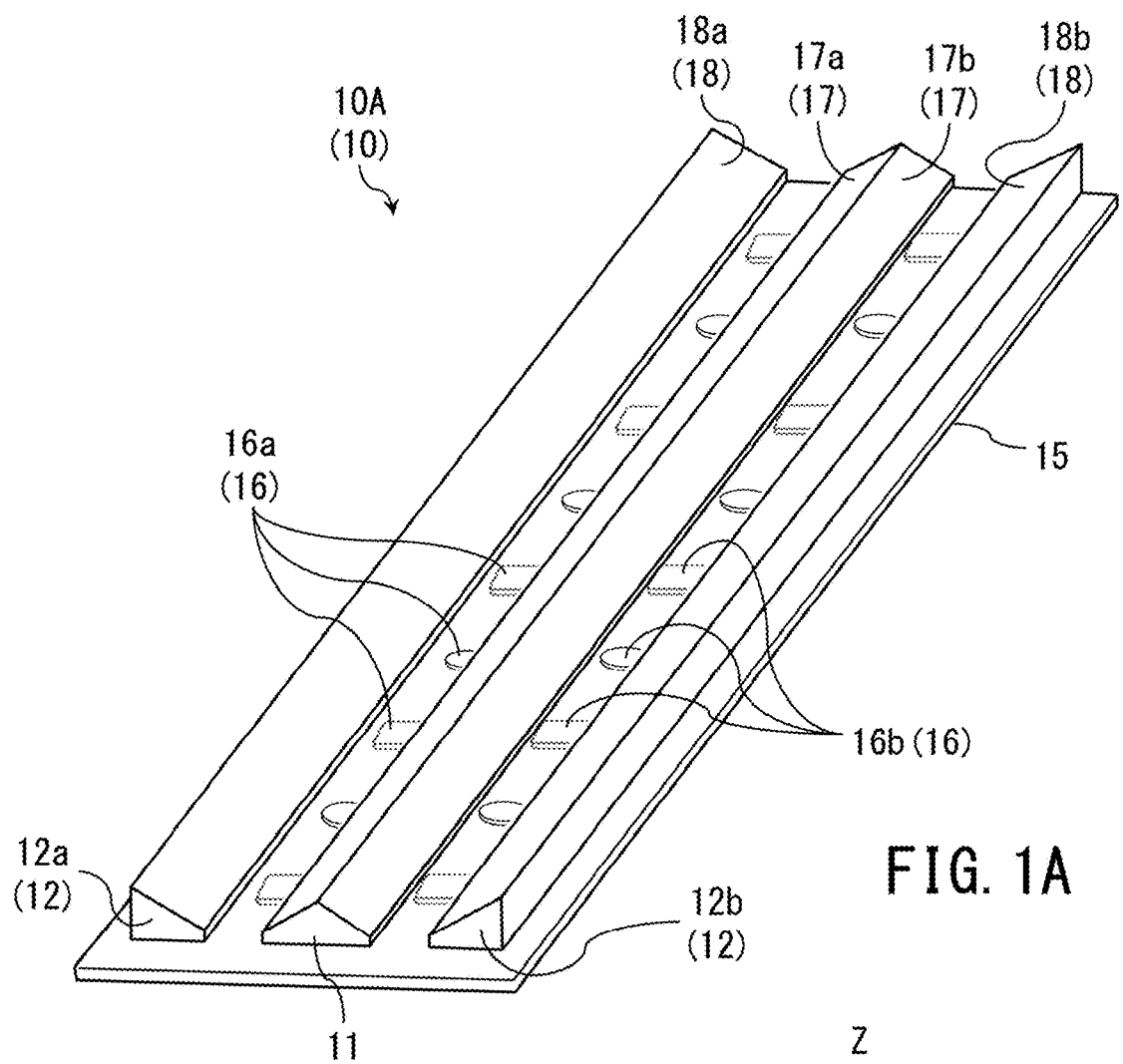
FIG. 1A is a perspective view of an LED lighting device according to one embodiment of the present invention.
Figure 1B:
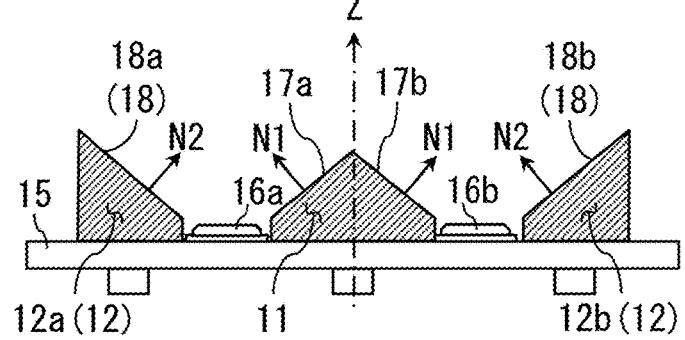
FIG. 1B is a cross-sectional view of the LED lighting device shown in FIG. 1A.
Figure 1C:
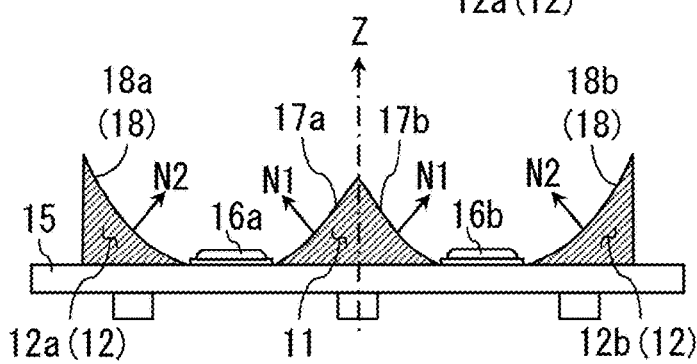

FIG. 1A is a perspective view of an LED lighting device 10A (10) according to one embodiment of the present invention, FIG. 1B is a cross-sectional view of the LED lighting device 10A, and FIG. 1C is a cross-sectional view of an LED lighting device according to a modification of the LED lighting device 10A.

Figure 2A:
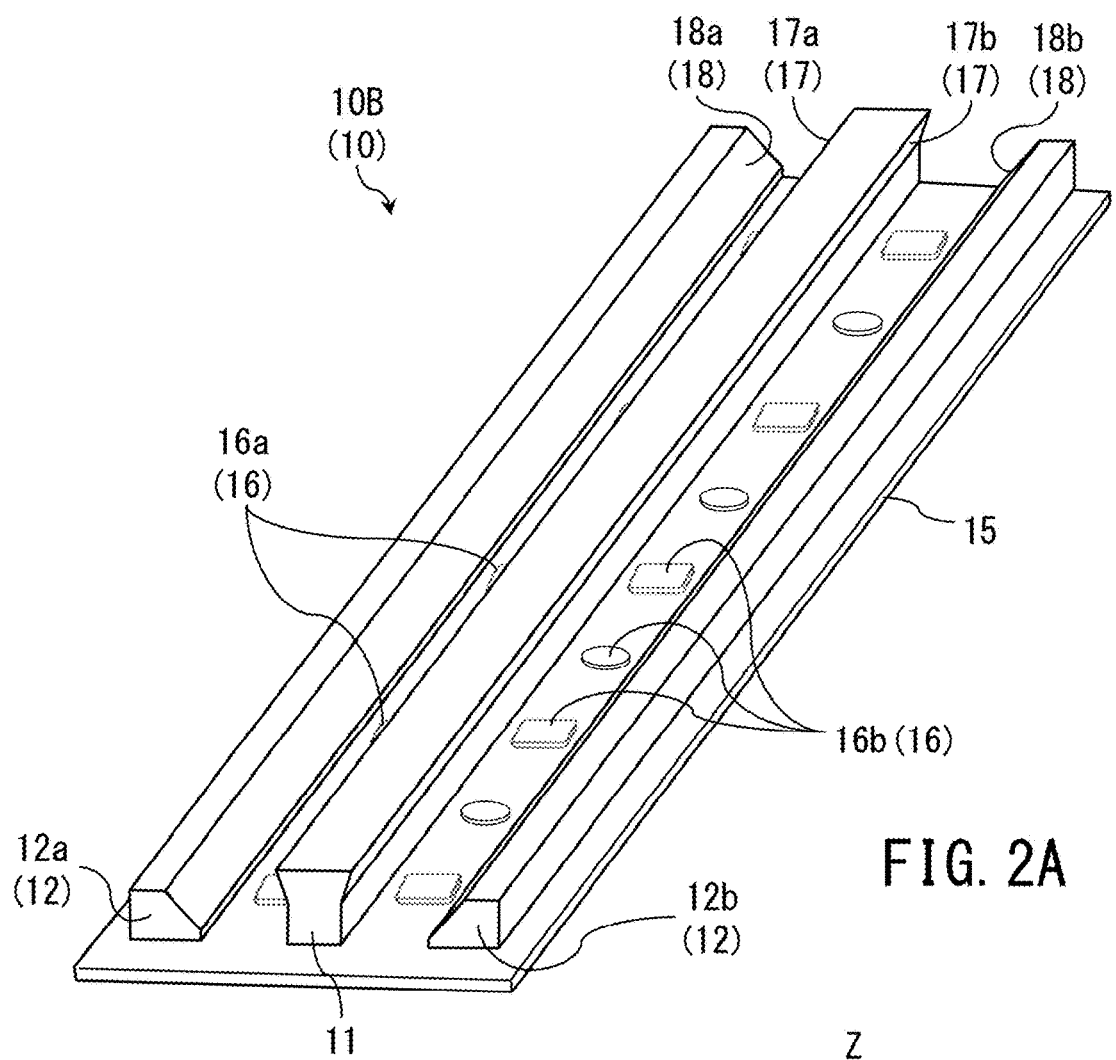
FIG. 2A is a perspective view of an LED lighting device according to another embodiment of the present invention.
Figure 2B:
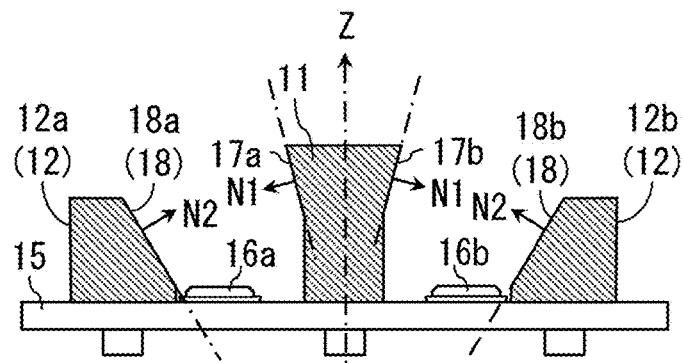
FIG. 2B is a cross-sectional view of the LED lighting device shown in FIG. 2A.

FIG. 2A is a perspective view of an LED lighting device 10B (10) according to another embodiment of the present invention, FIG. 2B is a cross-sectional view of the LED lighting device shown 10B, and FIG. 2O is a cross-sectional view of an LED lighting device according to a modification of the LED lighting device 10B. In the following description, each of the LED lighting devices 10A and 10B according to the embodiment is collectively denoted as the LED lighting device 10.

As shown in FIG. 1A and FIG. 2A, the LED lighting device 10 includes; a substrate 15 formed in an elongated shape; a first reflector 11 formed in a single rail shape on the surface of the substrate 15; plural LED elements 16a and 16b (collectively denoted as 16) arranged in rows at positions on both sides of the first reflector 11 on the surface of the substrate 15; and a pair of rail-shaped second reflectors 12a and 12b (collectively denoted as 12) formed on the surface of the substrate 15 such that the LED elements 16a are interposed between the first and second reflectors 11 and 12a and the LED elements 16b are interposed between the first and second reflectors 11 and 12b.

As shown in FIG. 1B, a pair of first reflecting surfaces 17a and 17b (collectively denoted as 17) are formed on respective both side surfaces of the first reflector 11 of the LED illumination device 10A such that the normal line $N_1$ of each of the first reflecting surfaces 17a and 17b includes a component in the same direction as the optical axis direction Z of the LED elements 16a and 16b.

As shown in FIG. 2B, a pair of first reflecting surfaces 17a and 17b are formed on respective both side surfaces of the first reflector 11 of the LED illumination device 10B such that the normal line $N_1$ of each of the first reflecting surfaces 17a and 17b includes a component in the direction opposite to the optical axis direction Z of the LED elements 16a and 16b.

Figure 2C:
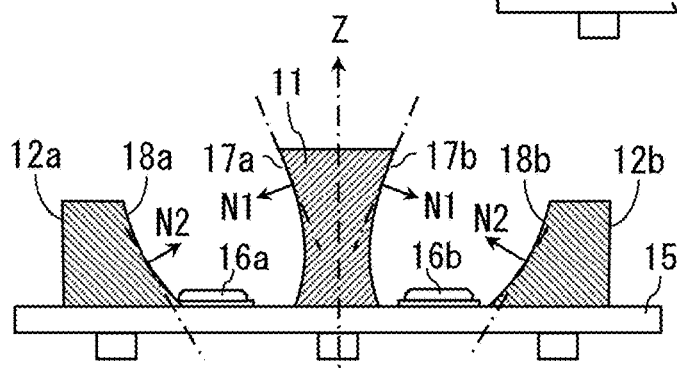
FIG. 2C is a cross-sectional view of an LED lighting device according to a modification of the LED lighting device shown in FIG. 2A.

The inclination of the respective reflecting surfaces formed on both side surfaces of the first reflector 11 is not limited to a specific inclination, and the shape of each reflecting surface is not limited to a specific shape. Each reflecting surface may be formed as a curved surface as shown in FIG. 10 and FIG. 2C, in addition to that each reflecting surface may be formed as a flat surface as shown in FIG. 1B and FIG. 2B.

The LED elements 16 (16a and 16b) emit light in a wavelength region necessary for photosynthesis in chlorophyll of a plant. In accordance with the plant to be cultivated, the LED elements 16 configured to emit the optimum wavelength are selected. Such selection of the LED elements includes at least two cases as follows: (i) only the white LED elements 16 in which the three primary colors of light are mixed are disposed on the surface of the substrate 15 as one case; and (ii) respective three types of LED elements 16 configured to emit monochromatic primary colors of red, green, or blue are combined and disposed on the surface of the substrate 15 as the other case.

The luminosity (i.e., light intensity) of the LED elements 16 is selected in such a manner that the photosynthetic photon flux density (PPFD) defined by the photon flux density only in the wavelength region from 400 nm to 700 nm that can be absorbed by chlorophyll becomes the optimum value in the illumination area.

The substrate 15 is an electronic circuit board made of an elongated flat plate, and the plural LED elements 16 are mounted on the front surface side of the substrate 15. On the substrate 15, a non-illustrated electronic circuit for supplying a predetermined current to the LED elements 16 is disposed at a position where this electronic circuit does not interfere with the LED elements 16. The electronic circuit provided on the substrate 15 is composed of plural electronic components and wiring for connecting them. Electric power is supplied to the substrate 15 via these electronic components and the wiring, and the LED elements 16 mounted on the substrate are supplied with this electric power so as to emit light.

For instance, the LED lighting device 10 can be formed structurally compatible with a conventional straight tube fluorescent lamp by accommodating the substrate 15 in a transparent cylinder and aligning the cap shape and size including length of this transparent cylinder with the conventional straight tube fluorescent lamp, wherein the LED elements 16 are mounted on the substrate 15 and the first and second reflecting surfaces 17 and 18 are formed on the reflectors of the substrate 15. Further, the substrate 15 is not limited to a substrate having a flat surface, and a substrate having a curved surface may be adopted.

In the embodiment, one set of LED elements 16 (16a and 16b) arranged on both sides of the first reflector 11 is regarded as a unit light source, and the central axis (i.e., Z-axis) of the first reflector 11 sandwiched between the set of LED elements 16 (16a and 16b) is treated as the optical axis of this unit light source. Since the first reflector 11 is provided at the position sandwiched between the set of LED elements 16 (16a and 16b), there is no possibility that the light emission of the LED elements 16 is concentrated around the optical axis (i.e., Z-axis). As a result, the spot-like high illuminance at the center of the illumination plane orthogonal to the optical axis (i.e., Z-axis) is diffused around the periphery.

In particular, in the LED illumination device 10B shown in FIG. 2B, the normal line $N_1$ of each of the first reflecting surfaces 17 (17a and 17b) includes a component in the direction opposite to the optical axis direction Z of the LED elements 16. In such a structure, the light emission of the LED elements 16 (16a and 16b) distributed to the center side of the illumination plane orthogonal to the optical axis (i.e., Z-axis) is reflected by the first reflecting surfaces 17 (17a and 17b) and then is distributed to the outside of the center of this illumination plane. As a result, spot-like high illuminance on the center side of the illumination plane orthogonal to the optical axis (i.e., Z-axis) is more effectively diffused around its periphery.

The first reflecting surfaces 17 are subjected to known surface processing such as mirror-finishing and coating such that the light emission of the LED elements 16 is highly efficiently reflected. Thus, the first reflecting surfaces 17 are maintenance-free in terms of reflectance and can maintain a reflectance value close to 100% without maintenance.

The respective second reflectors 12a and 12b are disposed at both side of the first reflector 11 such that the LED elements 16a are interposed between the first and second reflectors 11 and 12a and the LED elements 16b are interposed between the first and second reflectors 11 and 12b. The normal line $N_2$ of each of the second reflecting surfaces 18 (18a and 18b) includes a component in the same direction as the optical axis direction Z of the LED elements 16. In such a structure, the light emission of the LED elements 16 (16a and 16b), which is distributed to the peripheral portion far from the center of the illumination plane orthogonal to the optical axis (i.e., Z-axis), is reflected by the second reflecting surfaces 18 (18a and 18b) and then is distributed to the inside of the peripheral portion of the illumination plane. As a result, spot-like high illuminance on the center side of the illumination plane orthogonal to the optical axis is relaxed relatively.

The second reflecting surfaces 18 are subjected to known surface processing such as mirror-finishing and coating such that the light emission of the LED elements 16 is highly efficiently reflected. Thus, the second reflecting surfaces 18 are maintenance-free in terms of the reflectance (i.e., reflection power) and can maintain a reflectance value close to 100% without maintenance. The inclination angle of each second reflecting surface 18 is in the range of 30° to 65° with respect to the optical axis direction Z. When the inclination angle of each second reflecting surface 18 is less than 30° or exceeds 65°, the light distribution diffused from the peripheral portion of the illumination plane to its inside is small and it does not contribute to eliminate the spot-like high illuminance.

As shown in FIG. 1C and FIG. 2C, in a cross-sectional view including the optical axis of the LED elements 16, the second reflecting surfaces 18 of the respective second reflectors 12 may be formed as curved surfaces in some cases, similarly to the first reflecting surfaces 17 of the first reflector 11.

Figure 3:
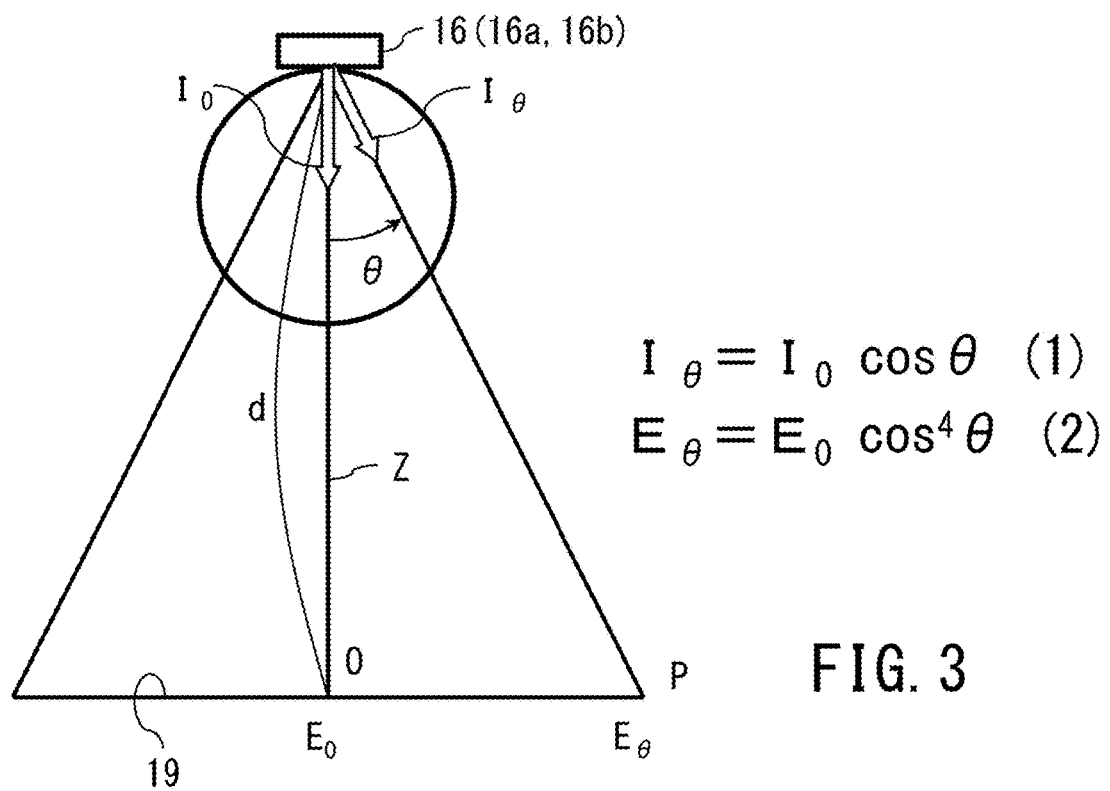
FIG. 3 is a schematic diagram illustrating directivity characteristics of an LED light source.

FIG. 3 is a schematic diagram illustrating the directivity characteristics of the LED light source. When the LED elements 16 are configured as planar light sources and the luminosity (i.e., light intensity) in the optical axis direction Z is defined as $I_0$, the directivity characteristics of the luminosity $I_\theta$ in the direction of the incident angle θ with respect to the optical axis direction Z is expressed by the following equation (1) according to Lambert's cosine law.

$$I_\theta = I_0 \cdot \cos \theta \qquad \text{Equation (1)}$$

It is assumed that the center point 0 is the intersection point between the optical axis Z and the illumination plane 19 separated from the LED elements 16 by the distance d and the illuminance at the center point 0 is denoted as $E_0$. As shown in FIG. 3, the intersection point P is defined as the point where the illumination plane 19 intersects with the straight line starting from the LED elements 16 and being inclined from the optical axis Z by the angle θ. The illuminance $E_\theta$ of the intersection point P is expressed by the following equation (2) according to the cosine-fourth-power law.

$$E_\theta = E_0 \cdot \cos^4 \theta \qquad \text{Equation (2).}$$

Figure 4:
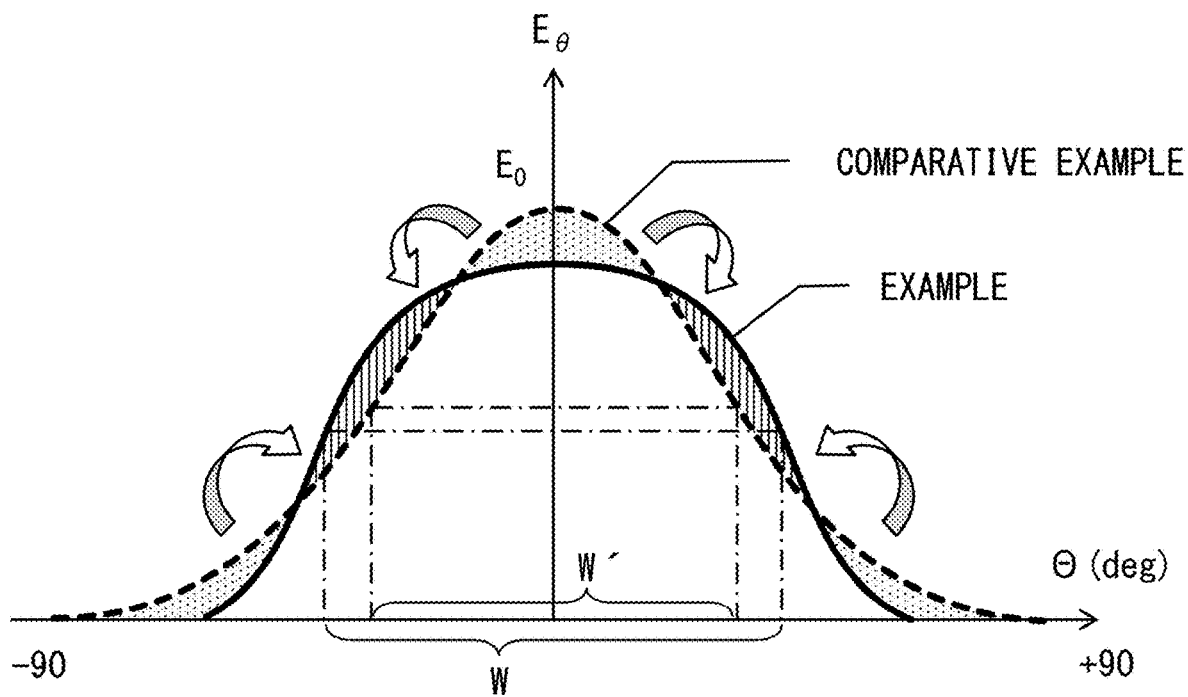
FIG. 4 is a graph illustrating illuminance distribution of the LED light source.

FIG. 4 is a graph illustrating the illuminance distribution of the LED light source. In FIG. 4, the horizontal axis of the graph indicates the incident angle θ with respect to the optical axis direction Z, and the vertical axis indicates the illuminance $E_\theta$ on the illumination plane 19 for each incident angle θ. In addition, the broken line indicates a comparative example in which the first reflector 11 and the second reflectors 12 do not exist and is a result based on the above-described equation (2). The solid line indicates an example of the present embodiment.

According to this example, the illuminance $E_0$ at the center point 0 on the illumination plane 19 orthogonal to the optical axis direction Z is diffused around the angular range W', in which the illuminance is equal to or more than half of the illuminance at the center point 0, by the action of the first reflector 11. As a result, the spot-like high illuminance at the center point 0 is relaxed, and the illuminance distribution in the illumination area can be made uniform. Further, light with an incident angle θ close to 90° from the optical axis direction Z is distributed toward the inside by the action of the second reflector 12. Consequently, light emission with an incidence angle θ, by which the light is difficult to reach the illumination plane 19, is distributed to the low illuminance region around the center point 0, and thereby the illuminance distribution is made uniform.

Accordingly, the angular range W of the example is wider than the angular range W' of the comparative example. Thus, it is unnecessary to arrange the LED elements 16 at narrow intervals in order to ensure a predetermined illuminance over the entire surface of the illumination plane 19. Hence, it is possible to contribute to cost reduction by reducing the number of the LED elements 16 to be used. Further, since the angular range W can be expanded without adopting an expansion means such as a diffusion plate being turbid in milky white, the LED elements 16 can be mounted at positions close to the illumination plane 19. As a result, power consumption is reduced by reducing the light emission amount of the LED elements 16, and the running cost can be suppressed.

Figure 5:
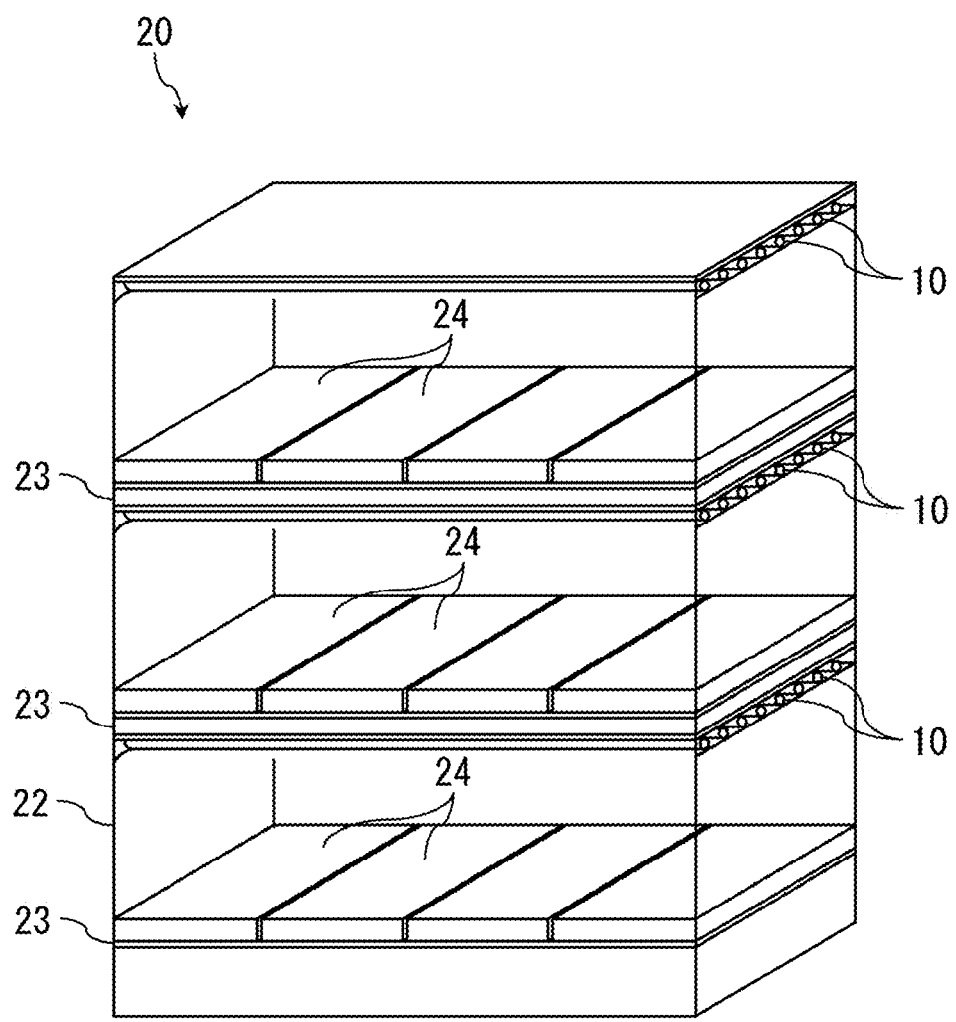
FIG. 5 is a perspective view of a plant cultivation shelf according to one embodiment of the present invention.

FIG. 5 is a perspective view of a plant cultivation shelf 20 according to one embodiment of the present invention. The plant cultivation shelf 20 includes the LED lighting devices 10, shelf boards 23 on which plants are placed, and support members 22 that support the LED lighting devices 10 and the shelf boards 23 at positions where they face each other.

The plural shelf boards 23 (three stages in the case of FIG. 5) installed in the horizontal direction with a space provided therebetween are supported by the four supporting props (i.e., support members 22) provided on the respective four corners. Non-illustrated plants are placed on the top surfaces of the respective shelf boards 23 via cultivation containers 24.

Plural LED lighting devices 10 are provided on the back surface of every shelf board 23 except the bottommost shelf board 23 so that the plants placed on the top surface of every shelf board 23 except the top shelf board 23 is illuminated from above by the LED lighting devices 10.

Although the linear illumination devices 10 are illustrated, the LED illumination devices 10 are not limited to such a shape and planar LED illumination devices may also be used. Although it is not illustrated, a water supply device for supplying water to the cultivation container 24 may be provided in some cases. In addition, a non-illustrated caster is fixed to the bottom portion of each support member 22 to be in contact with the floor surface, so that the entire plant cultivation shelf 20 can be easily moved.

The plant cultivation shelf 20 according to the embodiment can illuminate plural plants arranged in the cultivation container 24 with uniform illuminance distribution by using the LED lighting devices 10. This configuration makes it possible to equalize the growth of plural plants. Since the plant cultivation shelf 20 can equalize the illuminance distribution without using a diffusion plate that attenuates the LED light, the plant cultivation shelf 20 can suppress the operational cost by avoiding the illuminance loss of the LED light.

EXAMPLES

Hereinafter, embodiments of the present invention will be described in more detail by referring to comparative examples and examples.

Figure 6A:
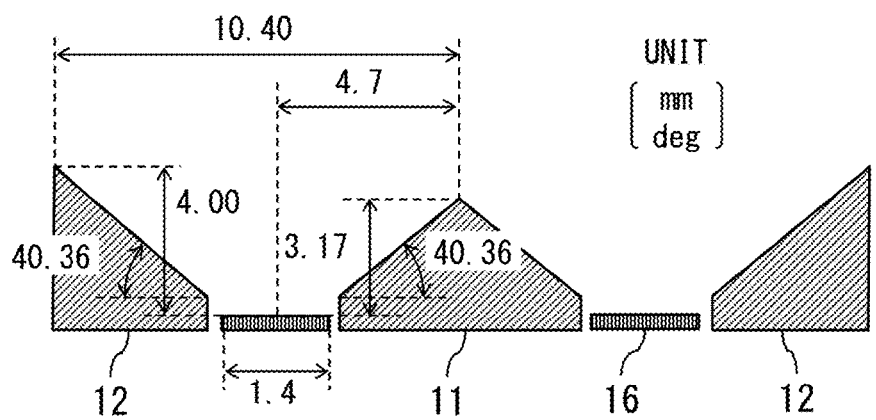
FIG. 6A is a cross-sectional view of the LED elements, the first reflector, and the second reflectors according to the first example for illustrating the design dimension of each component of the first example.
Figure 6B:
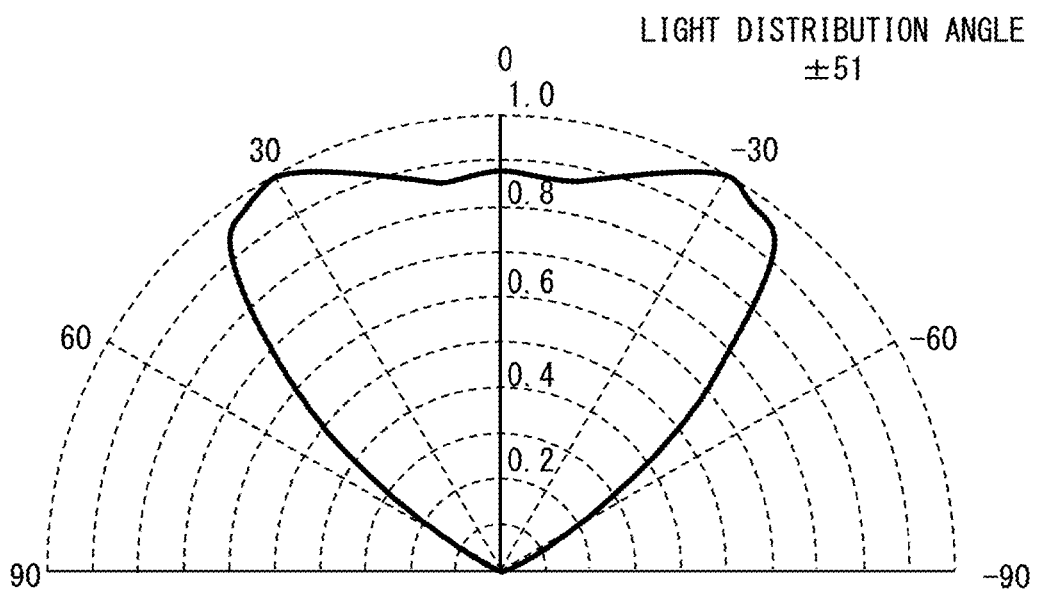
FIG. 6B is a light distribution graph (for each angle) of the LED illumination device of the first example.

FIG. 6A is a cross-sectional view of the LED elements, the first reflector, and the second reflectors according to the first example for illustrating the design dimension of each component of the first example, and FIG. 6B is a light distribution graph (for each angle) of the LED illumination device of the first example.

Figure 11A:
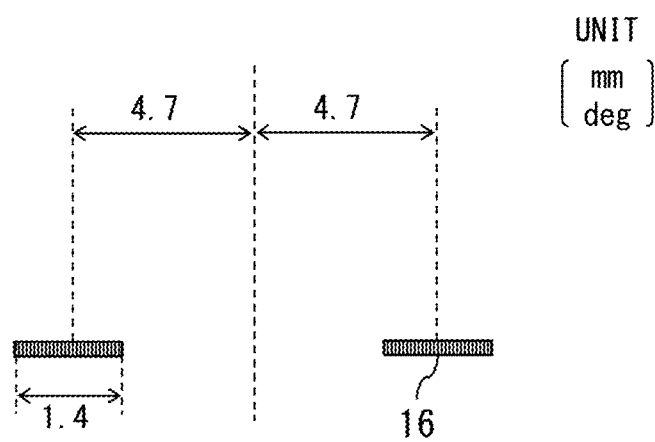
FIG. 11A is a layout view of only the LED elements in the first comparative example.
Figure 11B:
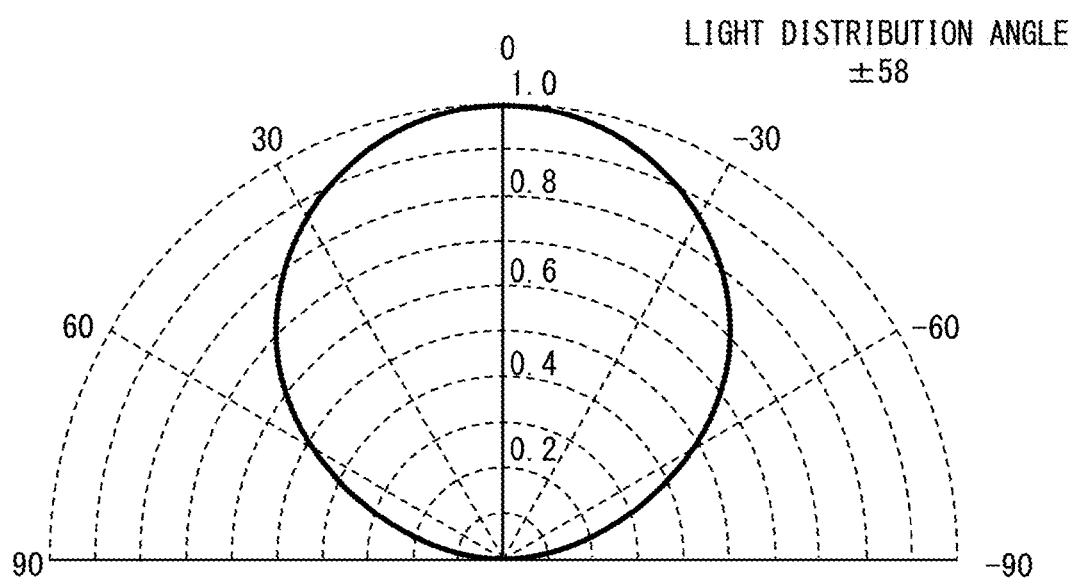
FIG. 11B is a light distribution graph (for each angle) of the LED illumination device of the first comparative example.

FIG. 11A is a layout view of only the LED elements in the first comparative example, and FIG. 11B is a light distribution graph (for each angle) of the LED illumination device of the first comparative example.

In the first example, the incident angle indicative of the maximum luminosity spreads from 0° in the first comparative example (FIG. 11B) to ±30° (FIG. 6B). This result shows that the spot-like high illuminance on the center side of the illumination plane is diffused to its periphery. Further, in the first example, the light distribution angle (i.e., the range between the plus-side incident angle and the minus-side incident angle indicative of the half-value of the maximum luminosity value) is narrowed from ±58° of the first comparative example (FIG. 11B) to ±51° (FIG. 6B). It can be confirmed from this result that the light distribution at the peripheral portion of the illumination plane is distributed to the inside. Thus, it can be understood that the reflectors 11 and 12 contribute to equalization of the illuminance distribution in the illumination area.

Figure 7A:
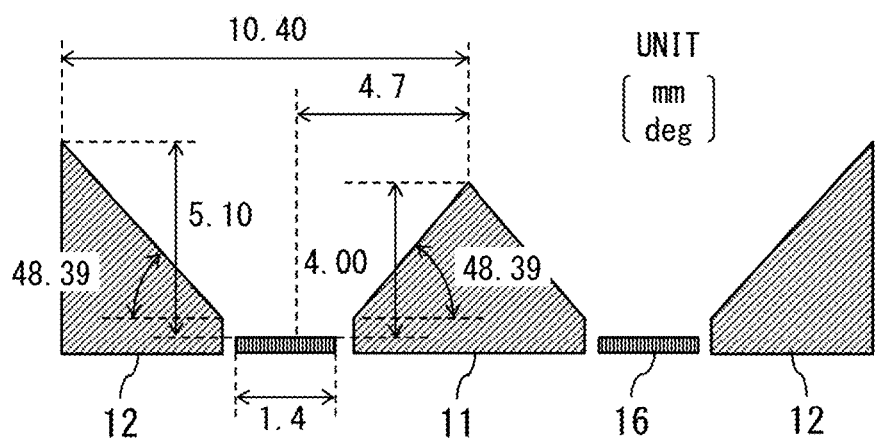
FIG. 7A is a cross-sectional view of the LED elements, the first reflector, and the second reflectors according to the second example for illustrating the design dimension of each component of the second example.
Figure 7B:
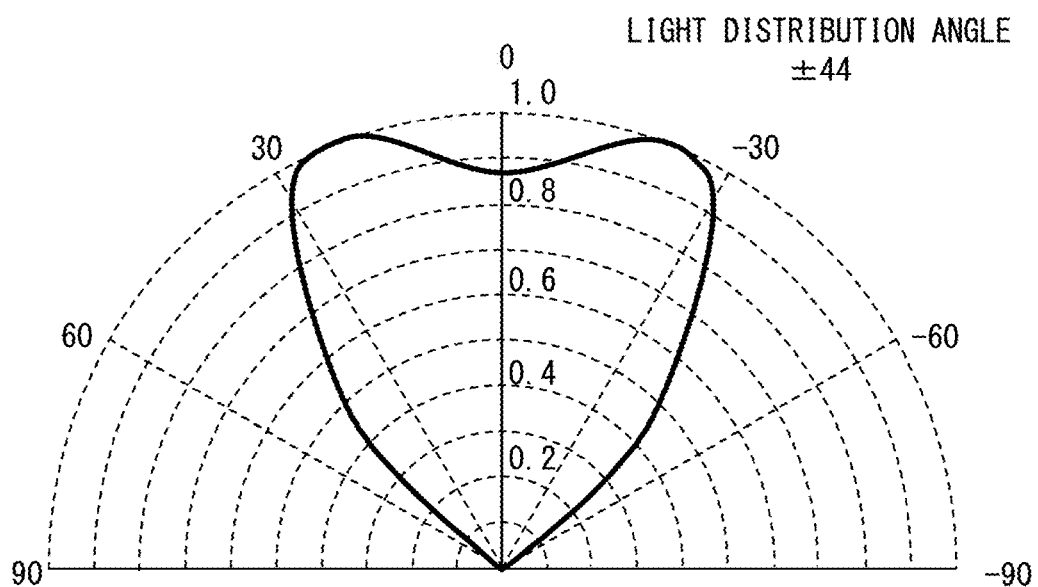
FIG. 7B is a light distribution graph (for each angle) of the LED illumination device of the second example.

FIG. 7A is a cross-sectional view of the LED elements, the first reflector, and the second reflectors according to the second example for illustrating the design dimension of each component of the second example. FIG. 7B is a light distribution graph (for each angle) of the LED illumination device of the second example.

In the second example, the reflectors 11 and 12 are adjusted to be higher than in the first example. As is clear from FIG. 7B, the second example enables a narrower light distribution angle being further reduced to ±44° and enables uniform illuminance distribution in which the illumination area is narrowed and the illuminance is increased.

Figure 8A:
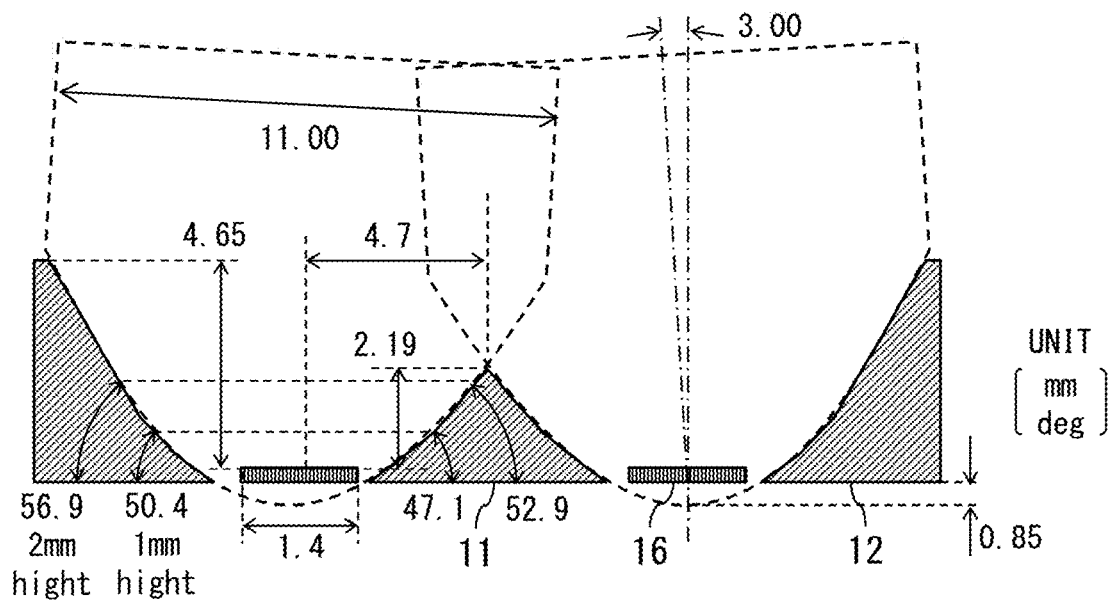
FIG. 8A is a cross-sectional view of the LED elements, the first reflector, and the second reflectors according to the third example for illustrating the design dimension of each component of the third example.
Figure 8B:
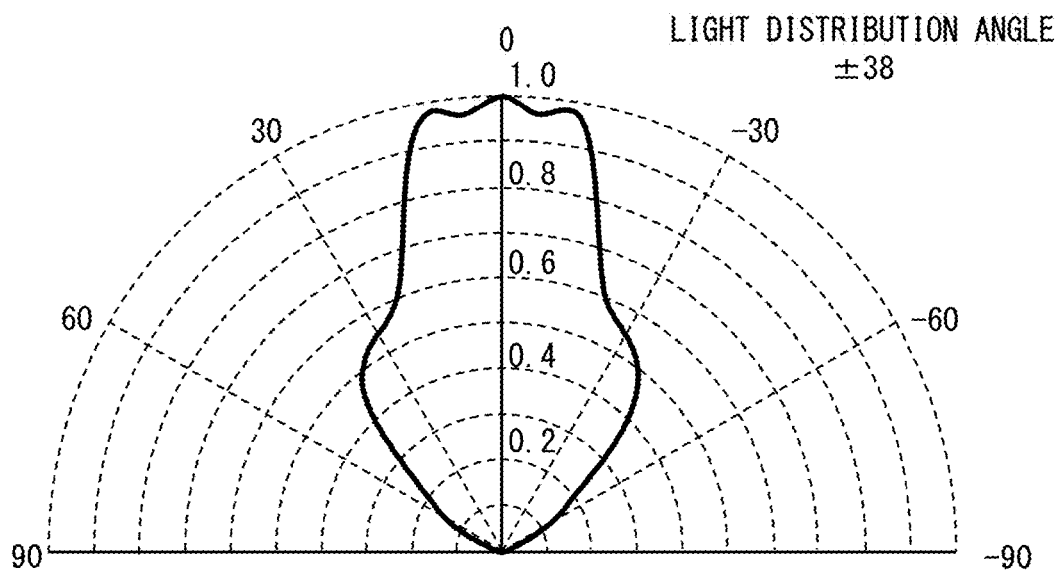
FIG. 8B is a light distribution graph (for each angle) of the LED illumination device of the third example.

FIG. 8A is a cross-sectional view of the LED elements, the first reflector, and the second reflectors according to the third example for illustrating the design dimension of each component of the third example. FIG. 8B is a light distribution graph (for each angle) of the LED illumination device of the third example.

In the third example, the reflector 11 and the right and left reflectors 12 are symmetrically formed such that the cross-section of reflecting surface on the right side of the reflector 11 and the cross-section of the reflecting surface of the right reflector 12 are located on a common parabola and the same holds true for the left side in cross-sectional view. The reflector 11 and the right and left reflectors 12 are also formed such that the axis of symmetry of each parabola is inclined inward. Consequently, the third example enables a narrower light distribution angle being further reduced to ±38° and enables uniform illuminance distribution in which the illumination area is further narrowed.

Figure 9A:
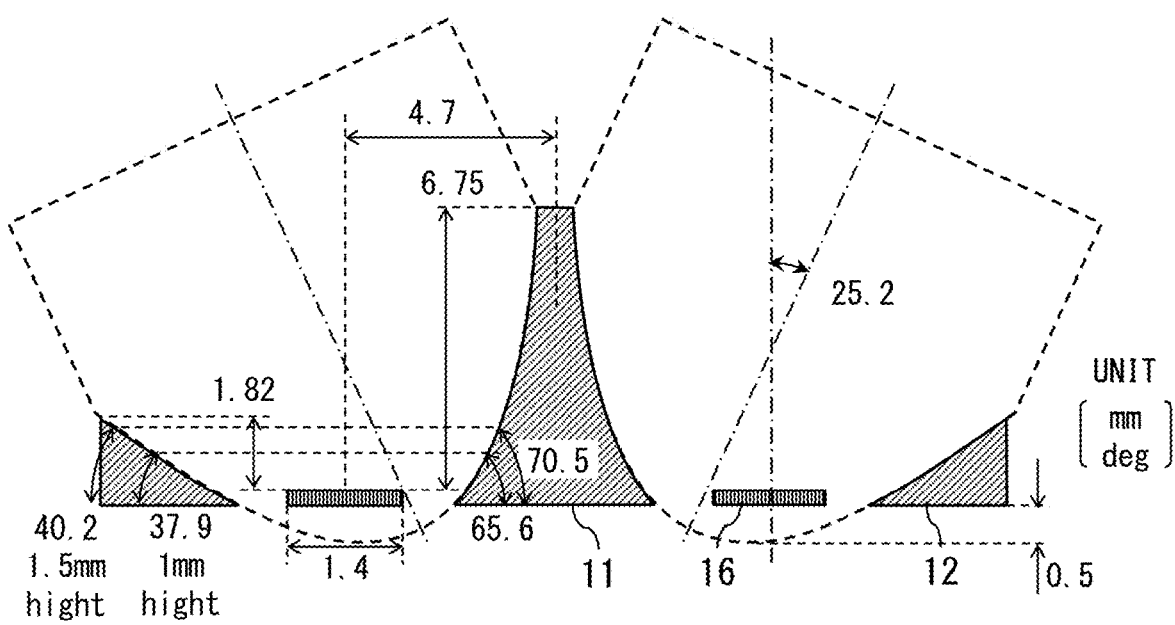
FIG. 9A is a cross-sectional view of the LED elements, the first reflector, and the second reflectors according to the fourth example for illustrating the design dimension of each component of the fourth example.
Figure 9B:
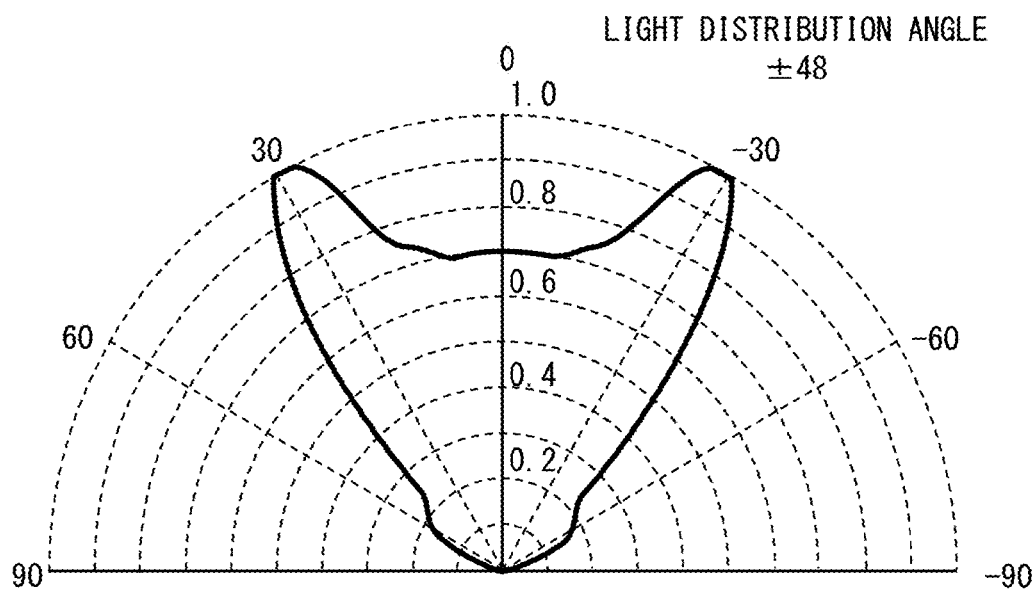
FIG. 9B is a light distribution graph (for each angle) of the LED illumination device of the fourth example.

FIG. 9A is a cross-sectional view of the LED elements, the first reflector, and the second reflectors according to the fourth example for illustrating the design dimension of each component of the fourth example. FIG. 9B is a light distribution graph (for each angle) of the LED illumination device of the fourth example.

Figure 10A:
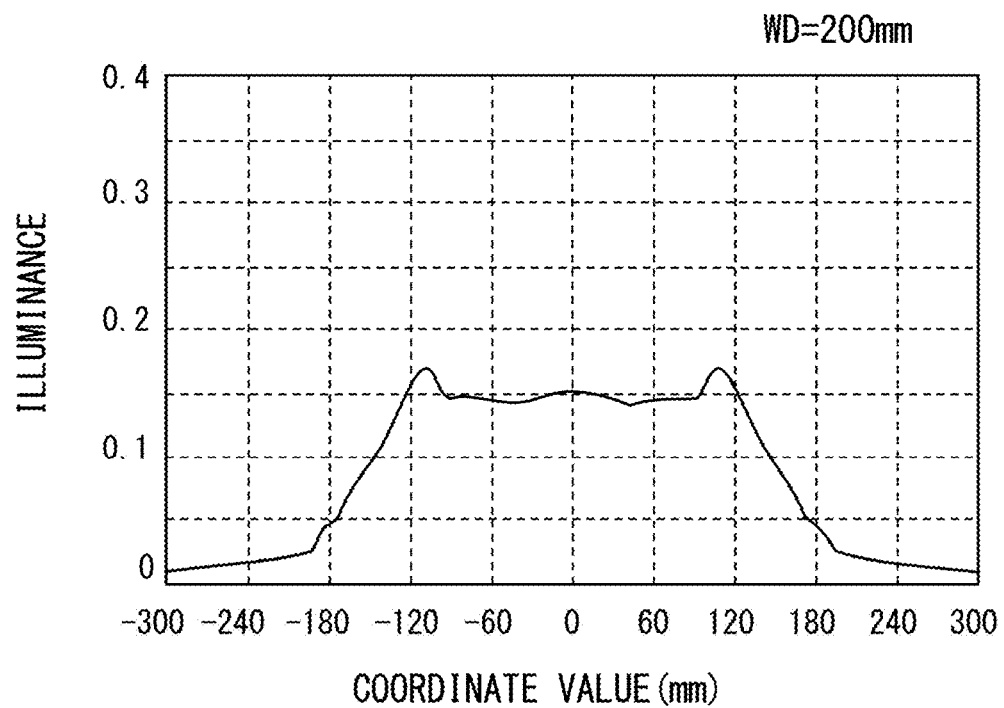
FIG. 10A is an illuminance graph of the LED lighting device of the fourth example.
Figure 10B:
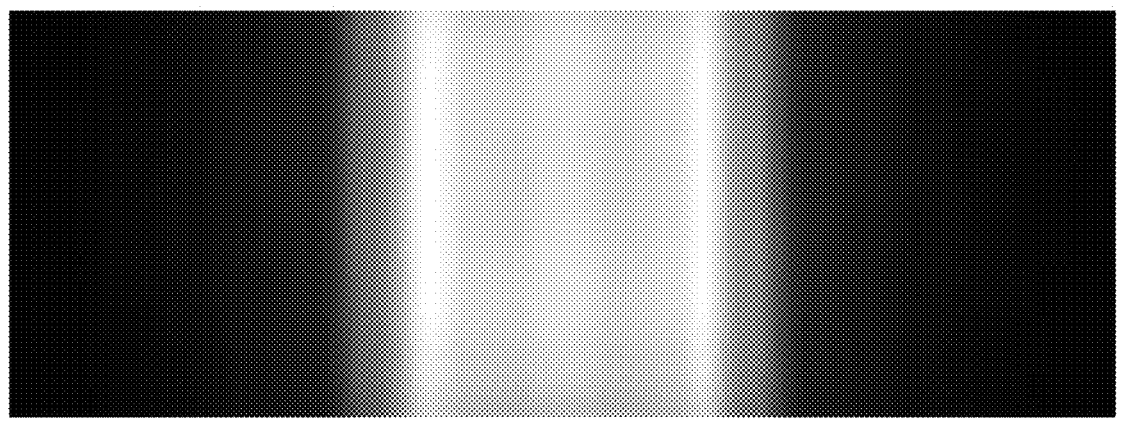
FIG. 10B is a light distribution image of the LED lighting device of the fourth example.

FIG. 10A is an illuminance graph of the LED lighting device of the fourth example, and FIG. 10B is a light distribution image of the LED lighting device of the fourth example.

Figure 12A:
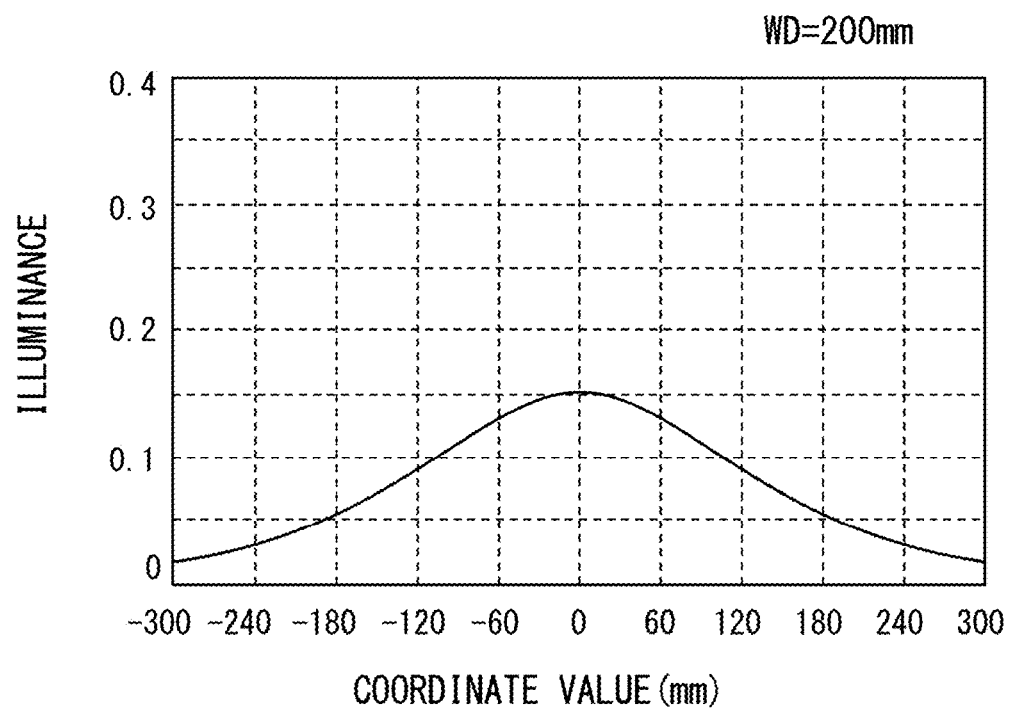
FIG. 12A is an illuminance graph of the LED lighting device of the first comparative example.
Figure 12B:
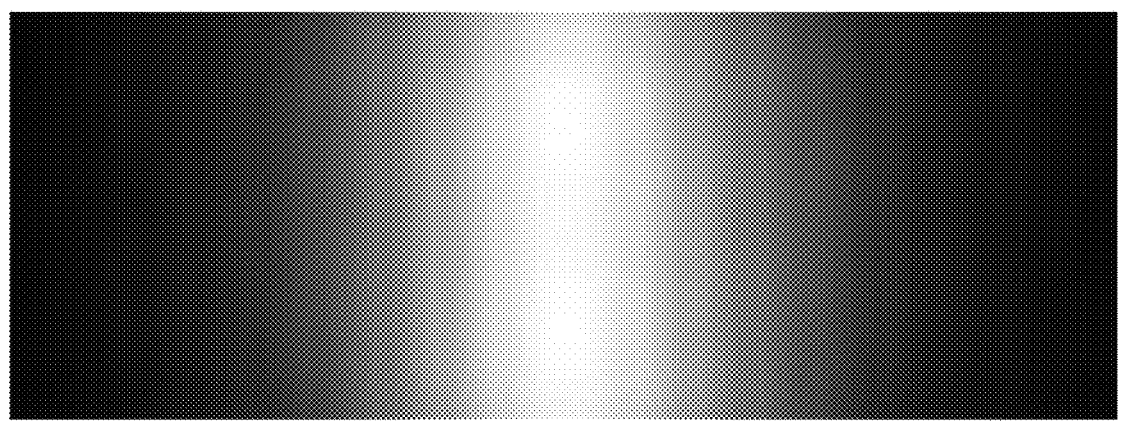
FIG. 12B is a light distribution image of the LED lighting device of the first comparative example.

FIG. 12A is an illuminance graph of the LED lighting device of the first comparative example, and FIG. 12B is a light distribution image of the LED lighting device of the first comparative example.

In the fourth example, the height of the first reflector 11 is adjusted to be higher than that of each of the right and left second reflectors 12. In the fourth example, the first reflector 11 and the right and left second reflectors 12 are symmetrically formed such that the cross-section of the reflecting surface on the right side of the first reflector 11 and the cross-section of the reflecting surface of the right second reflector 12 are located on a common parabola and the same holds true for the left side in cross-sectional view. The reflector 11 and the right and left reflectors 12 are also formed such that the axis of symmetry of each parabola is inclined outward.

As is clear from the comparison between the fourth example (FIG. 10A and FIG. 10B) and the first comparative example (FIG. 12A and FIG. 12B), an illumination area with extremely uniform (i.e., flattened) illumination distribution can be obtained in the fourth example.

Figure 13A:
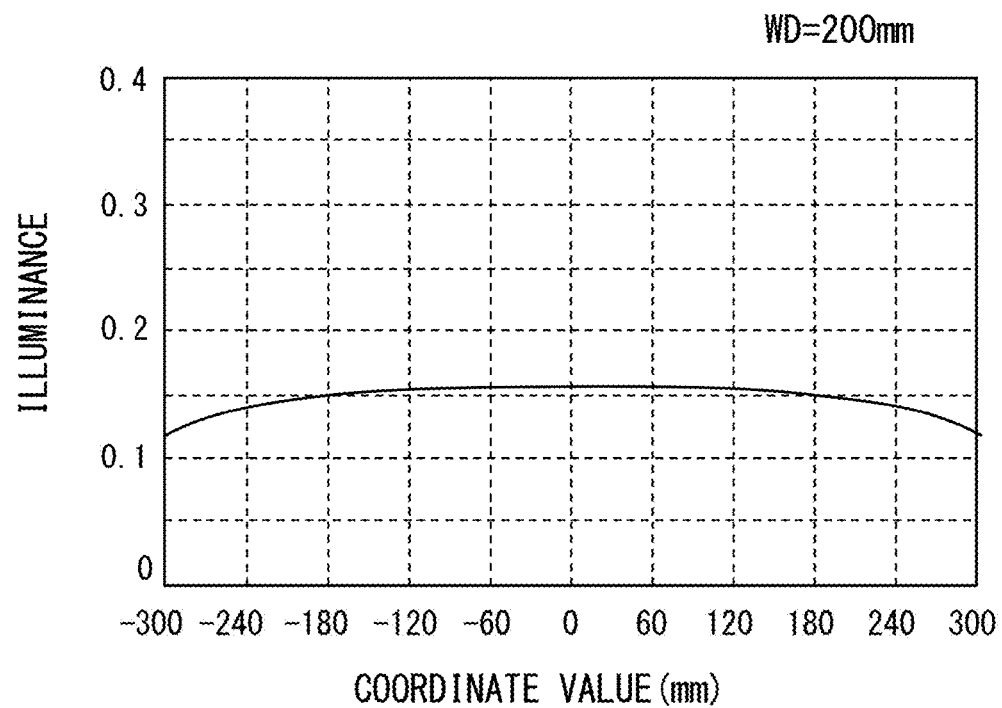
FIG. 13A is an illuminance graph of the LED lighting device of the fifth example.
Figure 13B:
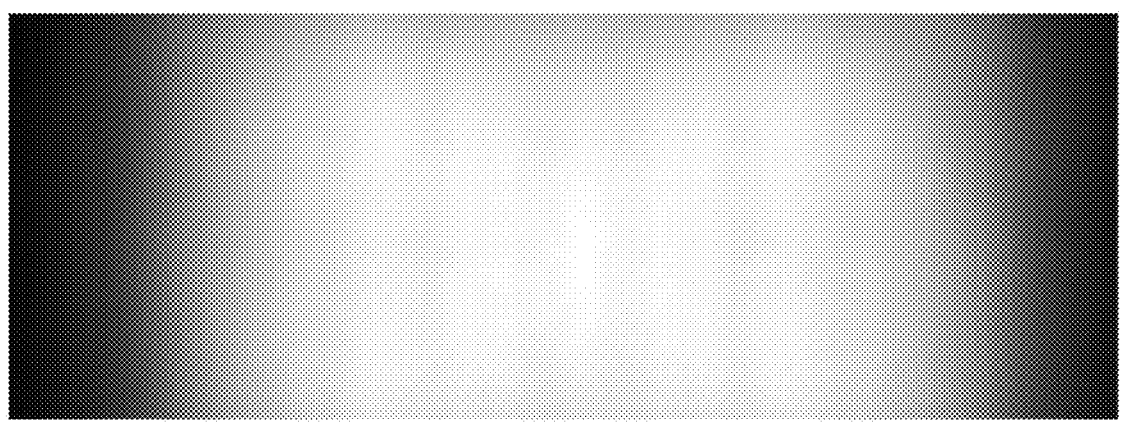
FIG. 13B is a light distribution image of the LED lighting device of the fifth example.

FIG. 13A is an illuminance graph of the LED lighting device of the fifth example, and FIG. 13B is a light distribution image of the LED lighting device of the fifth example.

Figure 14A:
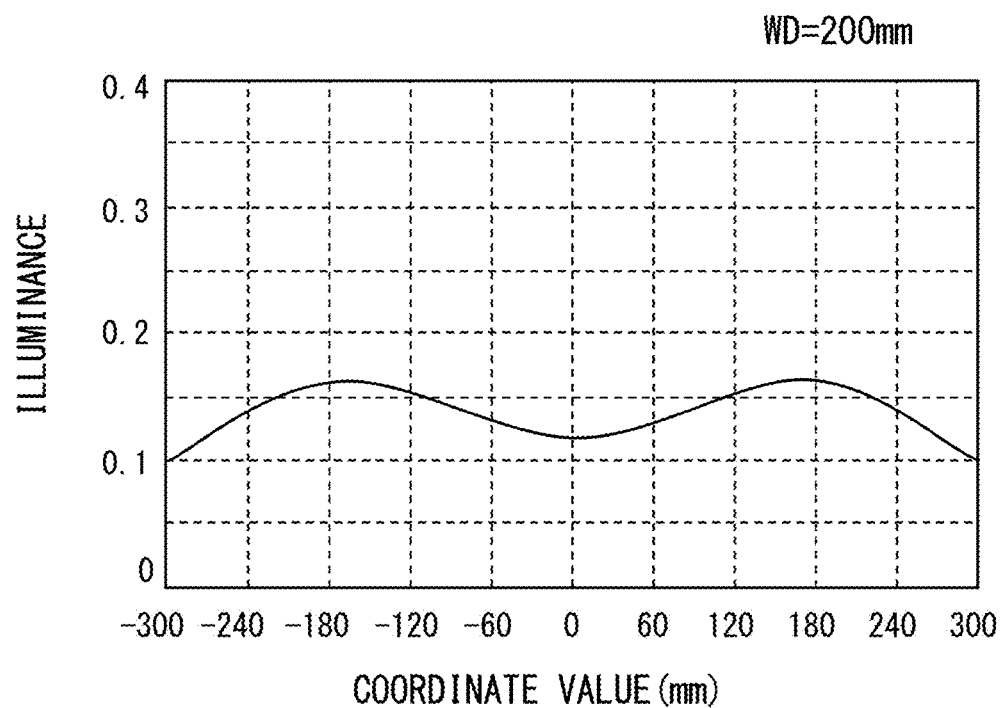
FIG. 14A is an illuminance graph of the LED lighting device of the second comparative example.
Figure 14B:
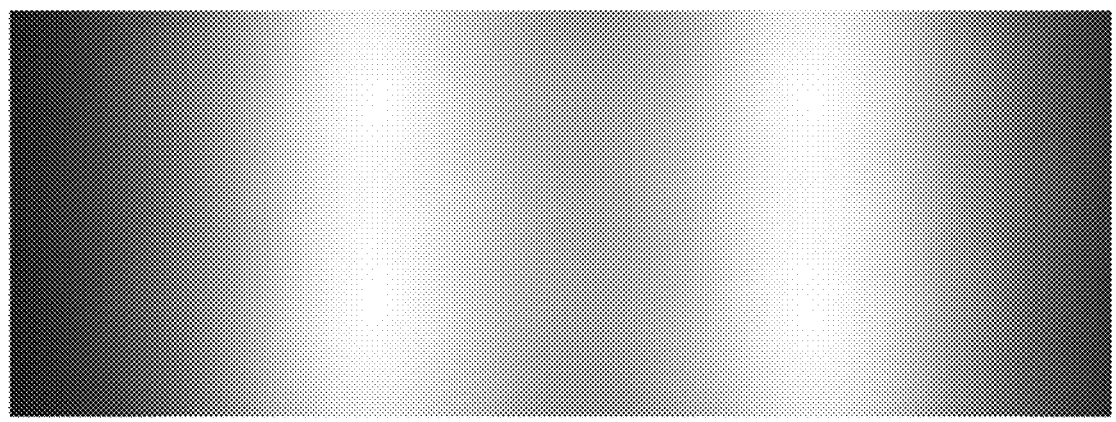
FIG. 14B is a light distribution image of the LED lighting device of the second comparative example.

FIG. 14A is an illuminance graph of the LED lighting device of the second comparative example, and FIG. 14B is a light distribution image of the LED lighting device of the second comparative example.

In the fifth example, two pairs of the LED lighting devices of the first example are arranged in parallel at intervals of 354 mm. In the second comparative example, two pairs of the LED lighting devices of the first comparative example are arranged in parallel at intervals of 354 mm. Although uniform illuminance distribution cannot be obtained by arranging plural LED lighting devices of the first comparative example in parallel as shown in FIG. 14A and FIG. 14B for the second comparative example, uniform (flattened) illuminance distribution can be widely obtained in the fifth example by arranging plural LED lighting devices of the first example in parallel as shown in FIG. 13A and FIG. 13B.

What is claimed is:

1. An LED lighting device adapted for illuminating an illumination plane, comprising:
   a substrate formed in an elongated shape;
   three reflectors, of which one first reflector is formed in a single rail shape on a surface of the substrate, wherein a first reflecting surface is formed on each of both side surfaces of the first reflector, and one pair of rail-shaped second reflectors is formed on the surface of the substrate; and
   a plurality of LED elements arranged in rows at positions on both sides of the first reflector on the surface of the substrate and adapted to emit light in an optical axis direction orthogonal to the illumination plane,
   wherein
      the pair of rail-shaped second reflectors is formed on the surface of the substrate in such a manner that each of the pair of rail-shaped second reflectors comprises one single second reflecting surface formed on an inner side surface of the corresponding second reflector and that the plurality of LED elements and the first reflector are interposed between the pair of rail-shaped second reflectors for obtaining a flattened illumination distribution in the illumination plane, and
   wherein:
      on a cross-section along the optical axis direction, the first reflector has a symmetric shape with respect to a center axis of the first reflector, the center axis of the first reflector being parallel to the optical axis;
      on the cross-section, the pair of the second reflectors are symmetric to one another with respect to the center axis of the first reflector; and
      on the cross-section, each of the second reflectors is asymmetric with respect to any line parallel to the center axis of the first reflector.

2. The LED lighting device according to claim 1, wherein a first reflecting surface is formed on each of both side surfaces of the first reflector in such a manner that a normal line of the first reflecting surface includes a component in a same direction as an optical axis direction of the plurality of LED elements.

3. The LED lighting device according to claim 1, wherein a first reflecting surface is formed on each of both side surfaces of the first reflector in such a manner that a normal line of the first reflecting surface includes a component in a direction opposite to an optical axis direction of the plurality of LED elements.

4. The LED lighting device according to claim 1, wherein a second reflecting surface is formed on an inner side surface of each of the pair of rail-shaped second reflectors in such a manner that a normal line of the second reflecting surface includes a component in a same direction as an optical axis direction of the plurality of LED elements.

5. The LED lighting device according to claim 4, wherein the first reflecting surface and the second reflecting surface are formed in such a manner that a cross-section of the first reflecting surface and a cross-section of the second reflecting surface are located on a common parabola in cross-sectional view.

6. A plant cultivation shelf comprising:
the LED lighting device according to claim 1;
a shelf board on which a plant is placed; and
a support member configured to support the LED lighting device and the shelf board at respective positions where the LED lighting device and the shelf board face each other.

* * * * *